(No Model.) 11 Sheets—Sheet 1.

F. T. NICHOLSON.
MACHINE FOR MAKING AND GUMMING ENVELOPES.

No. 542,003. Patented July 2, 1895.

WITNESSES:
L. Douville,
P. F. Eagle.

INVENTOR
Francis T. Nicholson.
BY
John A. Wiedersheim
ATTORNEY.

(No Model.) 11 Sheets—Sheet 3.

F. T. NICHOLSON.
MACHINE FOR MAKING AND GUMMING ENVELOPES.

No. 542,003. Patented July 2, 1895.

WITNESSES:
L. Douville
P. F. Nagle

INVENTOR
Francis T. Nicholson
BY
Joshua Biederbeck
ATTORNEY.

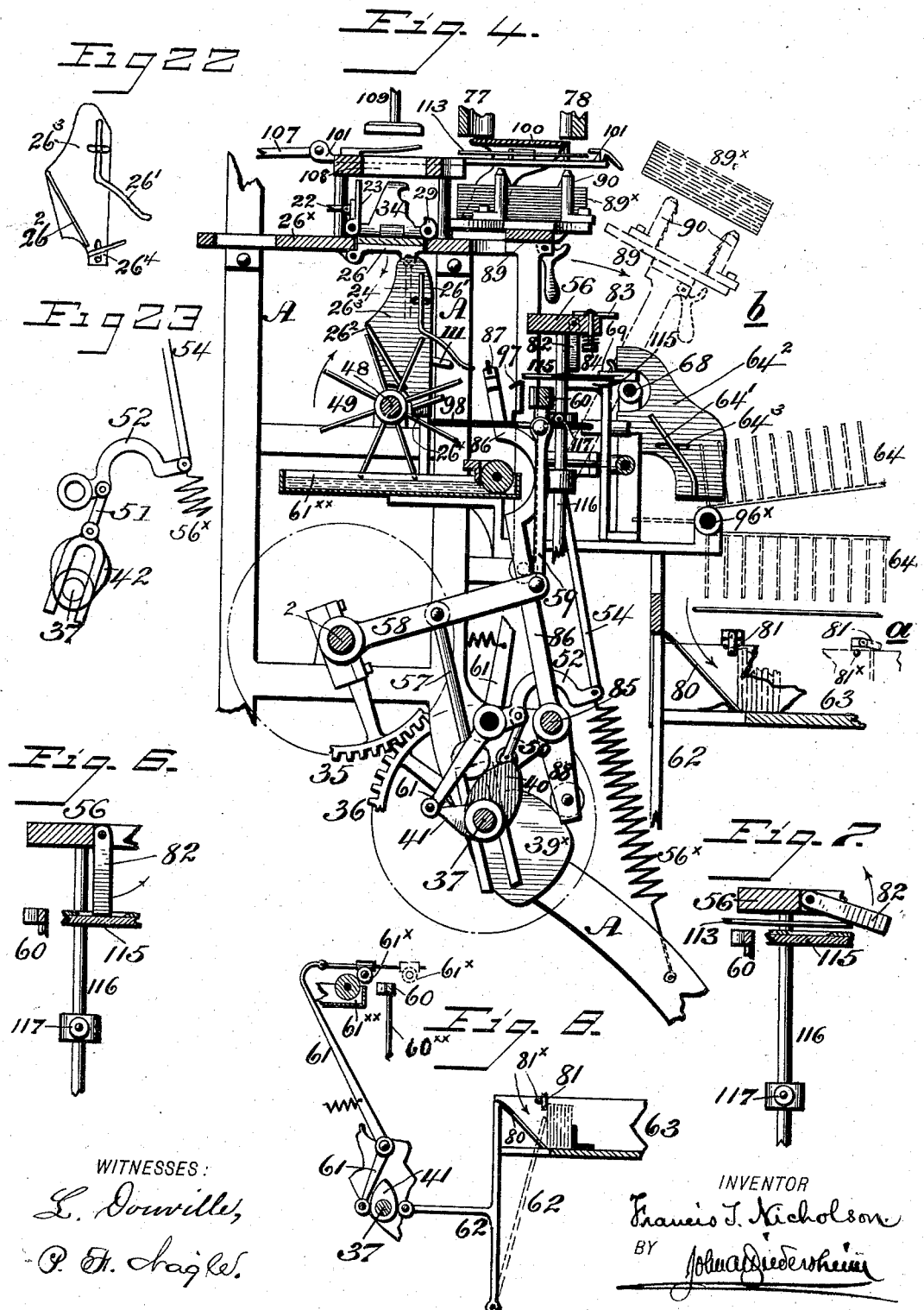

(No Model.) 11 Sheets—Sheet 5.
F. T. NICHOLSON.
MACHINE FOR MAKING AND GUMMING ENVELOPES.
No. 542,003. Patented July 2, 1895.
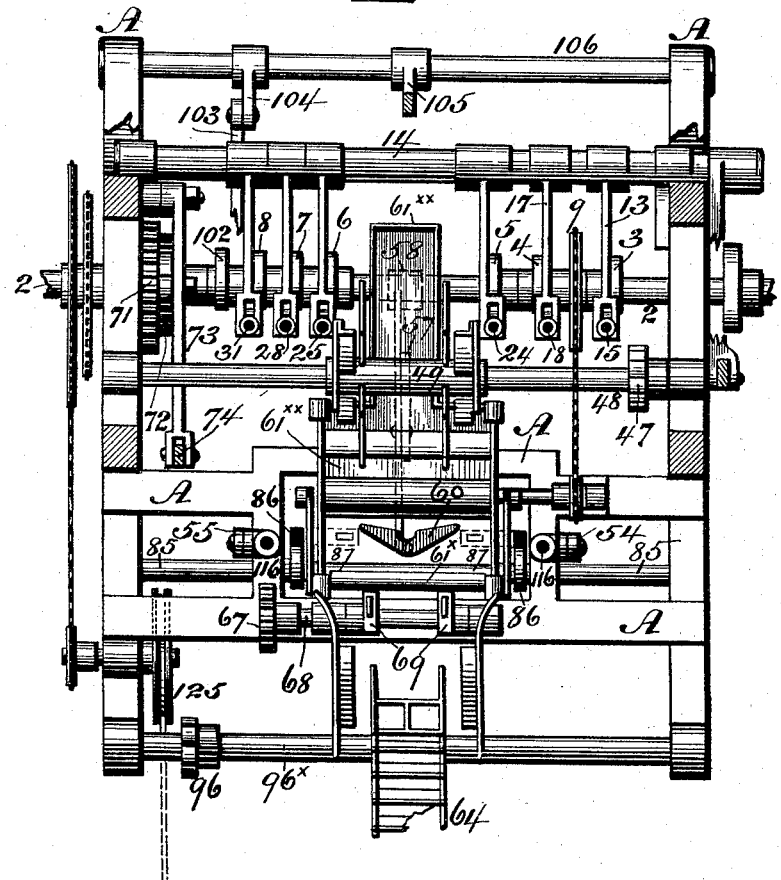
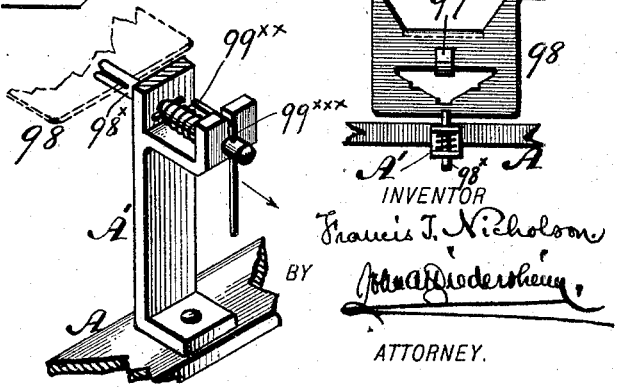
WITNESSES:
L. Douville,
P. H. Chagles.
INVENTOR
Francis T. Nicholson
BY John A. Biedersheim,
ATTORNEY.

(No Model.)   11 Sheets—Sheet 6.
F. T. NICHOLSON.
MACHINE FOR MAKING AND GUMMING ENVELOPES.
No. 542,003.   Patented July 2, 1895.
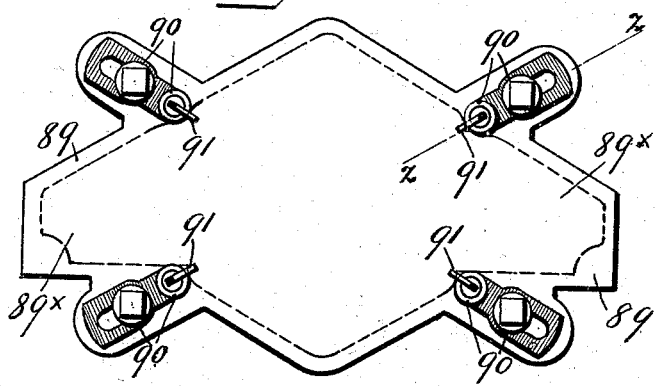
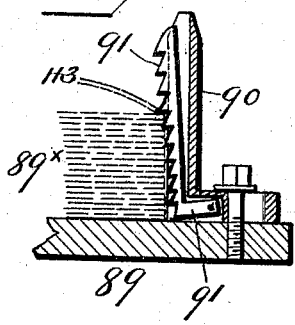
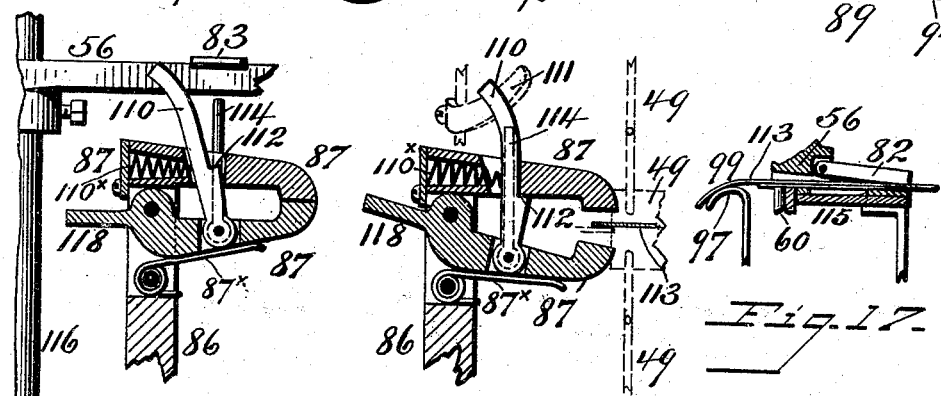
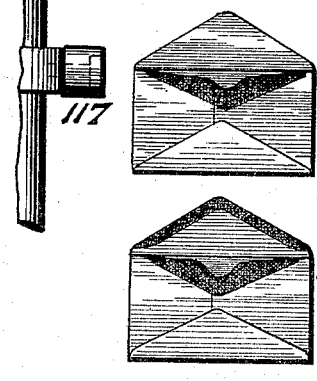
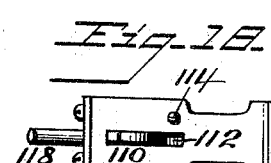
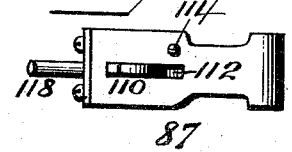
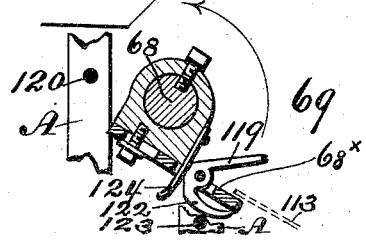
WITNESSES:
L. Douville,
O. F. Eagles.
INVENTOR
Francis T. Nicholson
BY
John Niederstein
ATTORNEY.

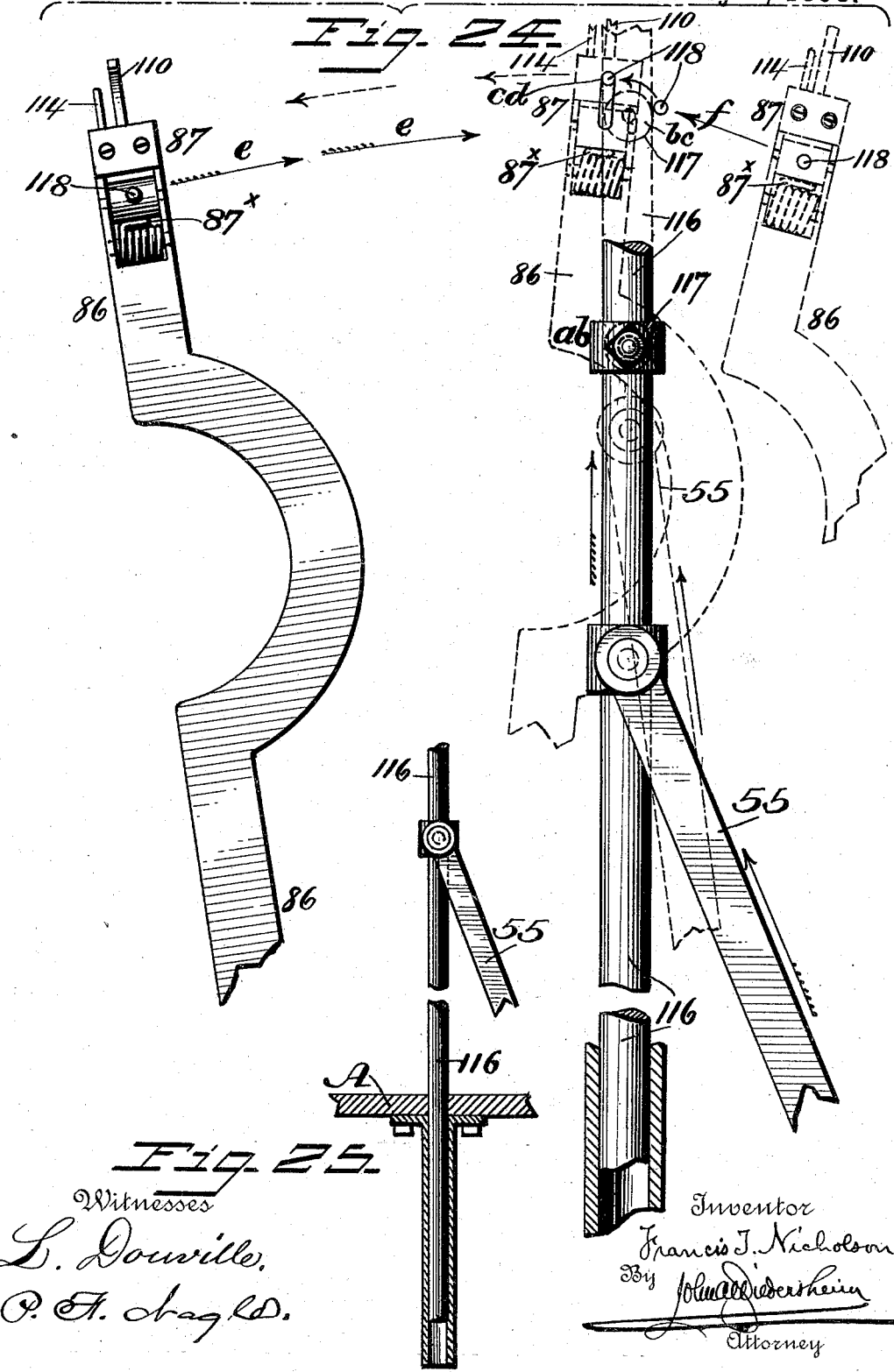

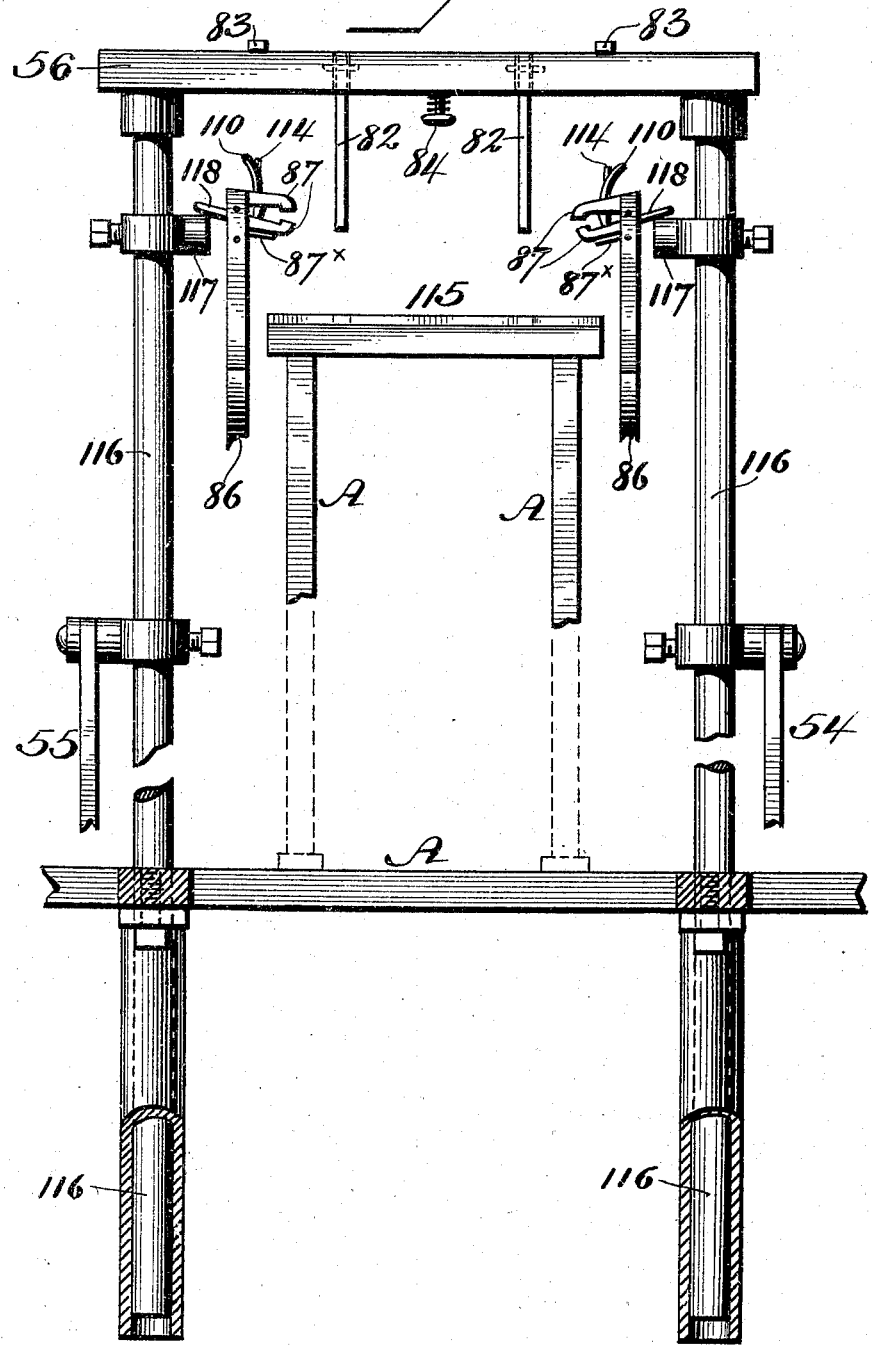

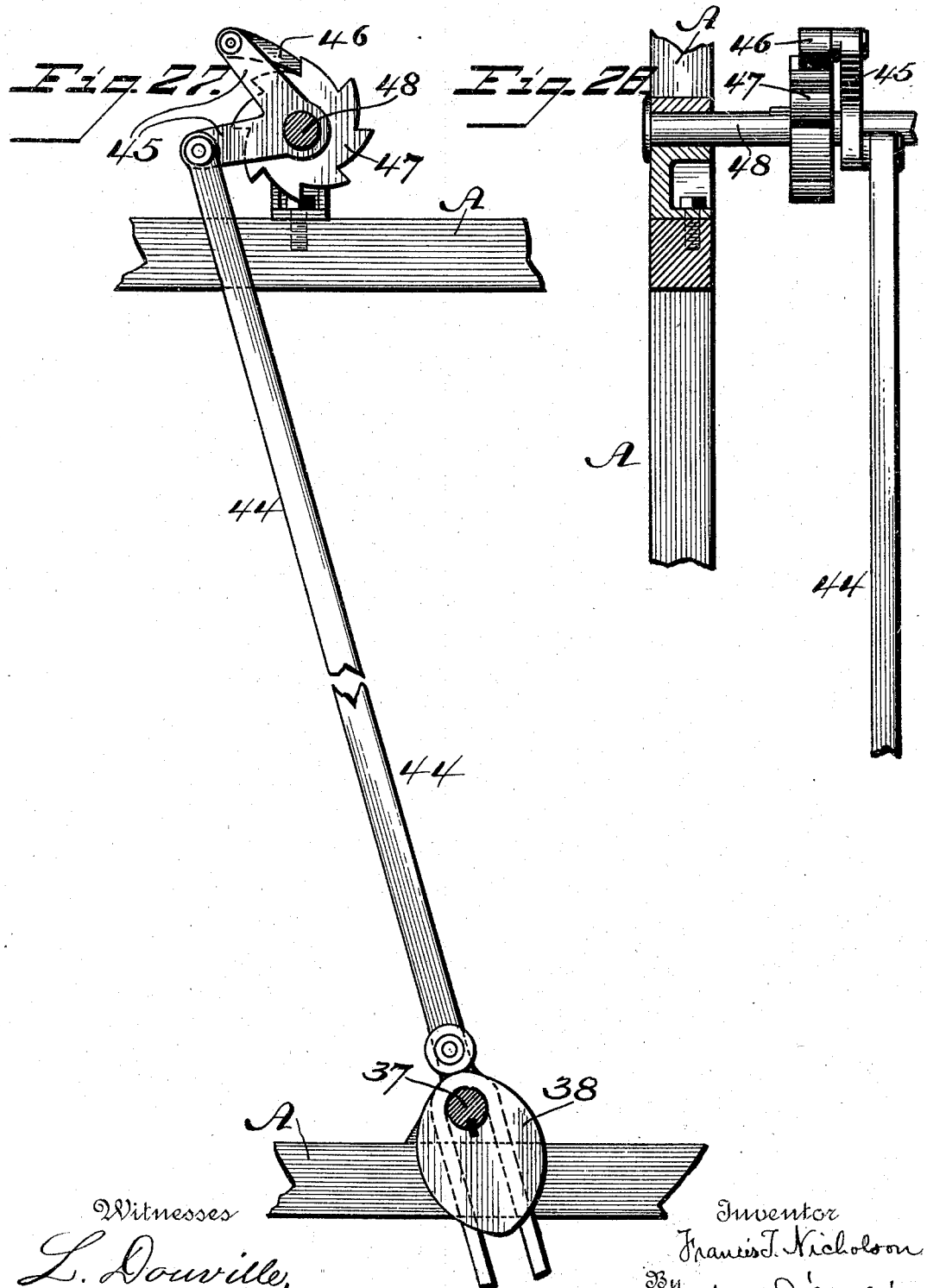

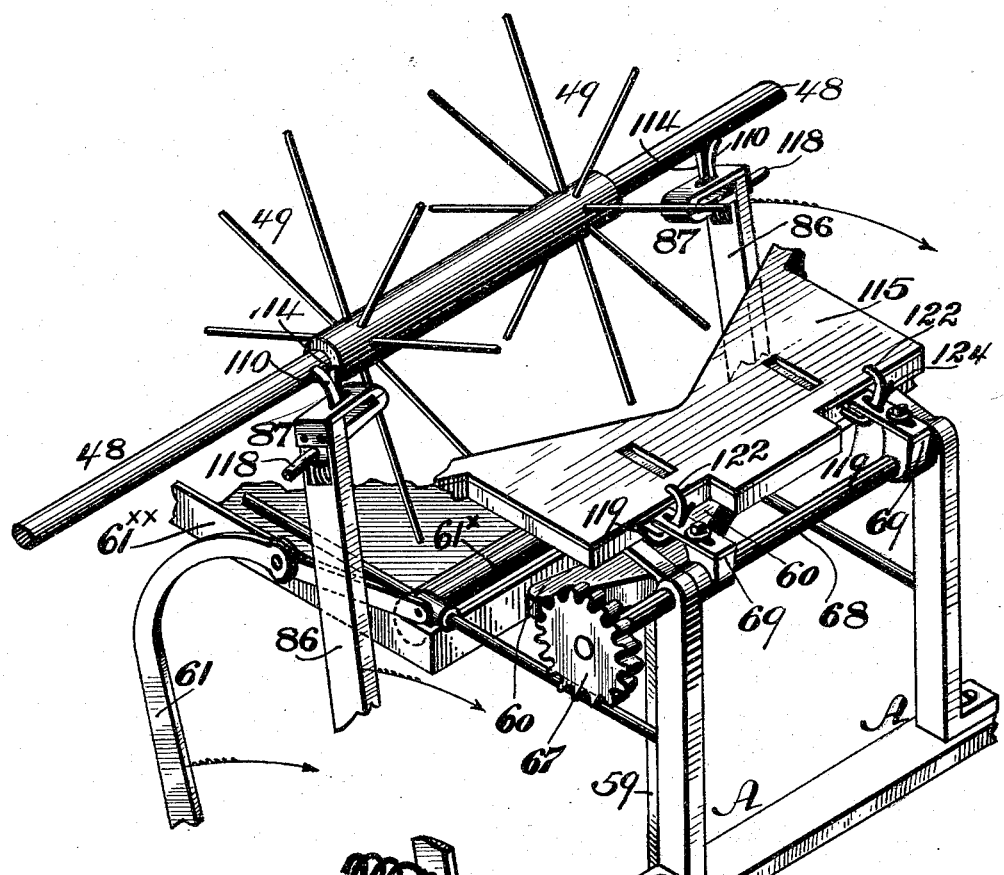
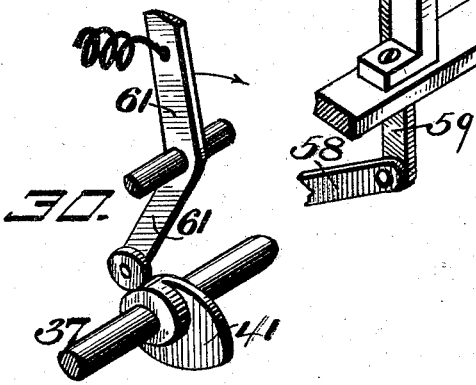

(No Model.)
F. T. NICHOLSON.
MACHINE FOR MAKING AND GUMMING ENVELOPES.
No. 542,003.  Patented July 2, 1895.
11 Sheets—Sheet 11.
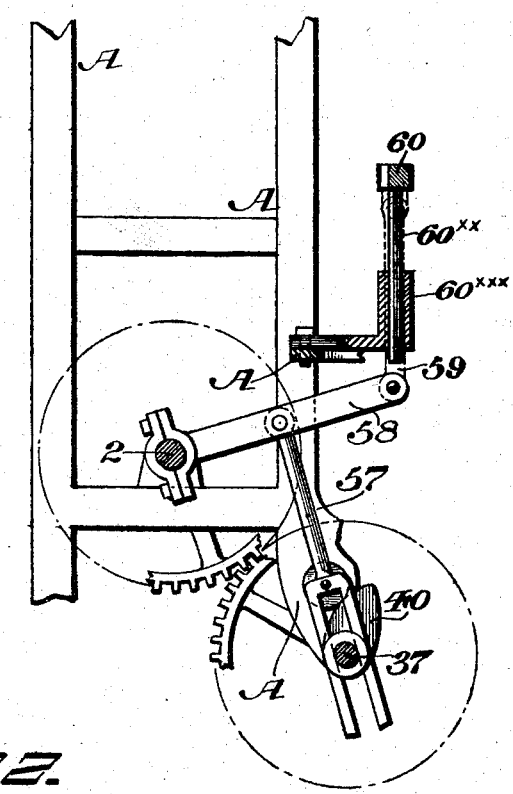
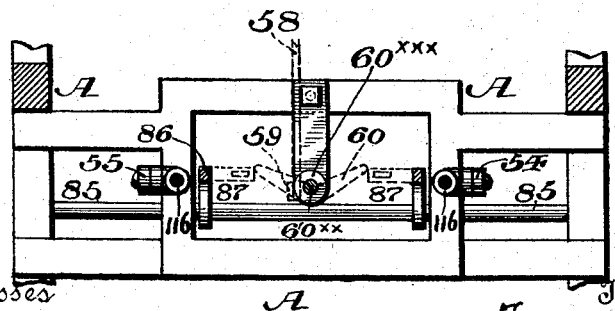
Witnesses
L. Douville,
O. F. Nagle.
Inventor
Francis T. Nicholson
By John A. Wiedersheim
Attorney

UNITED STATES PATENT OFFICE.

FRANCIS T. NICHOLSON, OF PHILADELPHIA, PENNSYLVANIA, ASSIGNOR TO CLARENCE WOLF, OF SAME PLACE.

MACHINE FOR MAKING AND GUMMING ENVELOPES.

SPECIFICATION forming part of Letters Patent No. 542,003, dated July 2, 1895.

Application filed March 5, 1892. Serial No. 423,853. (No model.)

*To all whom it may concern:*

Be it known that I, FRANCIS T. NICHOLSON, a citizen of the United States, residing in the city and county of Philadelphia, State of Pennsylvania, have invented a new and useful Improvement in Machines for Making and Gumming Envelopes, which improvement is fully set forth in the following specification and accompanying drawings.

My invention consists of an organized machine adapted to apply gum to the backs of the bodies of envelopes, the same being also adapted to be combined with an organized machine for manufacturing flap-gummed envelopes, so that the latter may be supplied to the former machine and thus be body-gummed.

Figure 1:
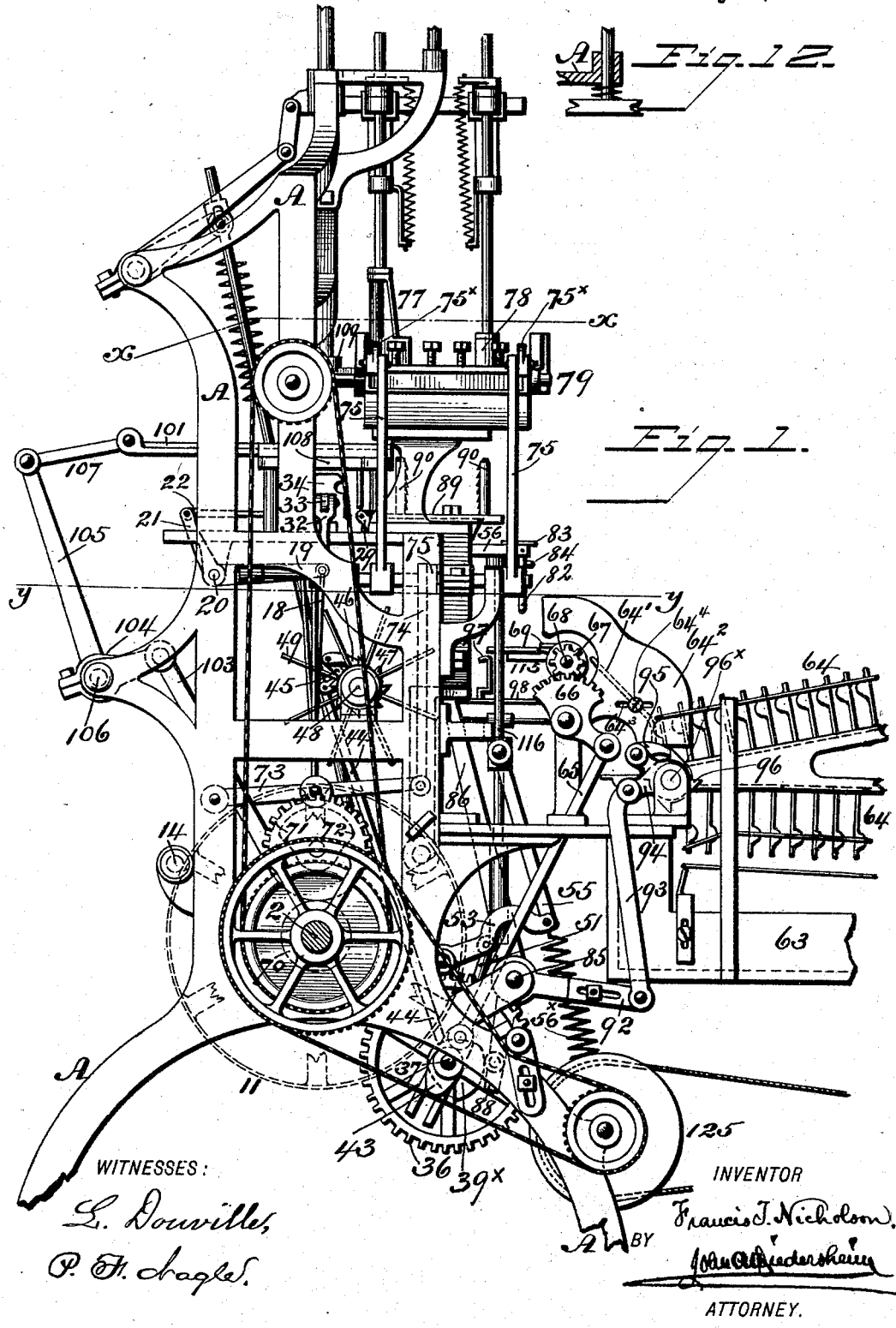
Figure 2:
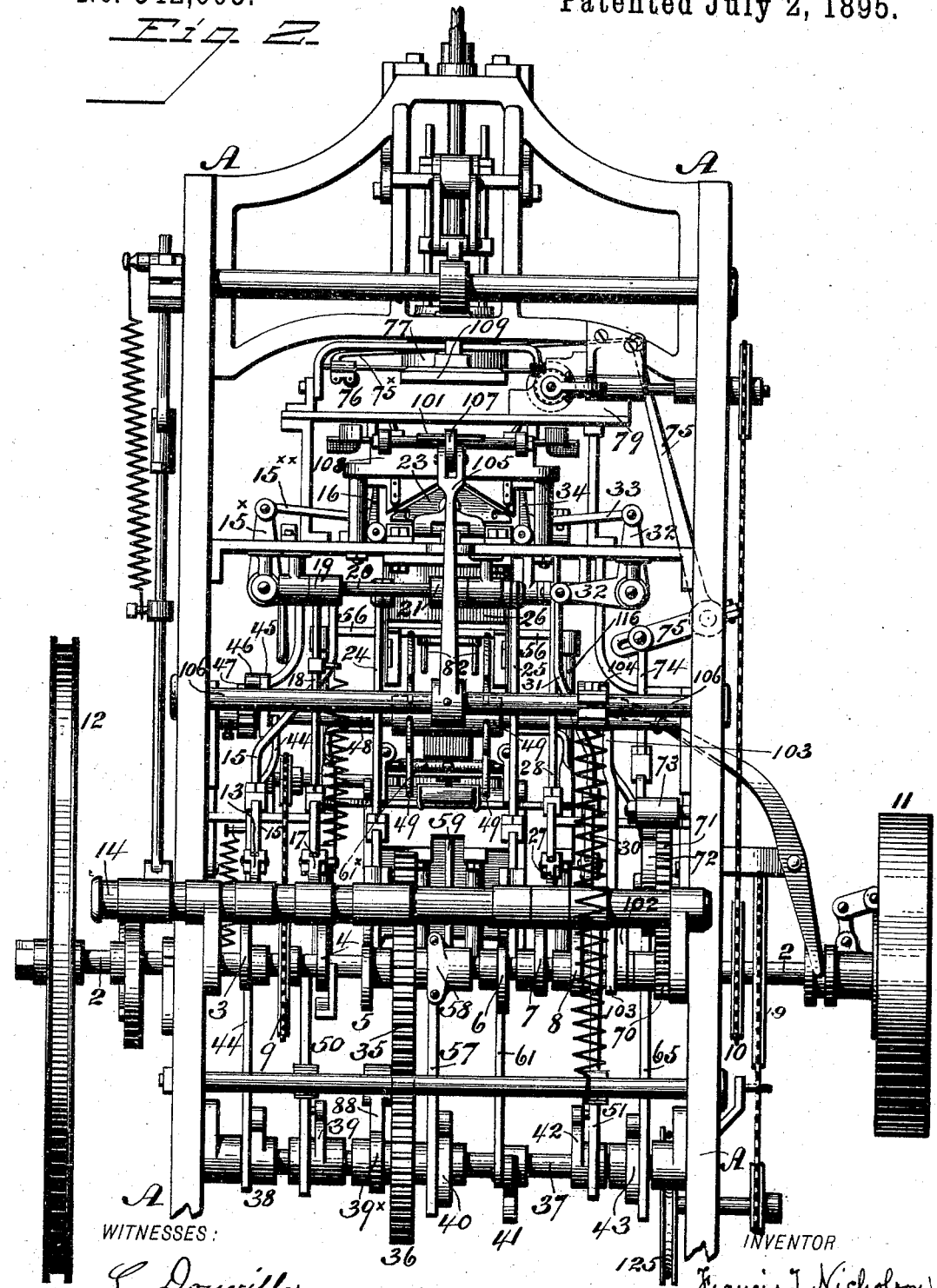
Figure 3:
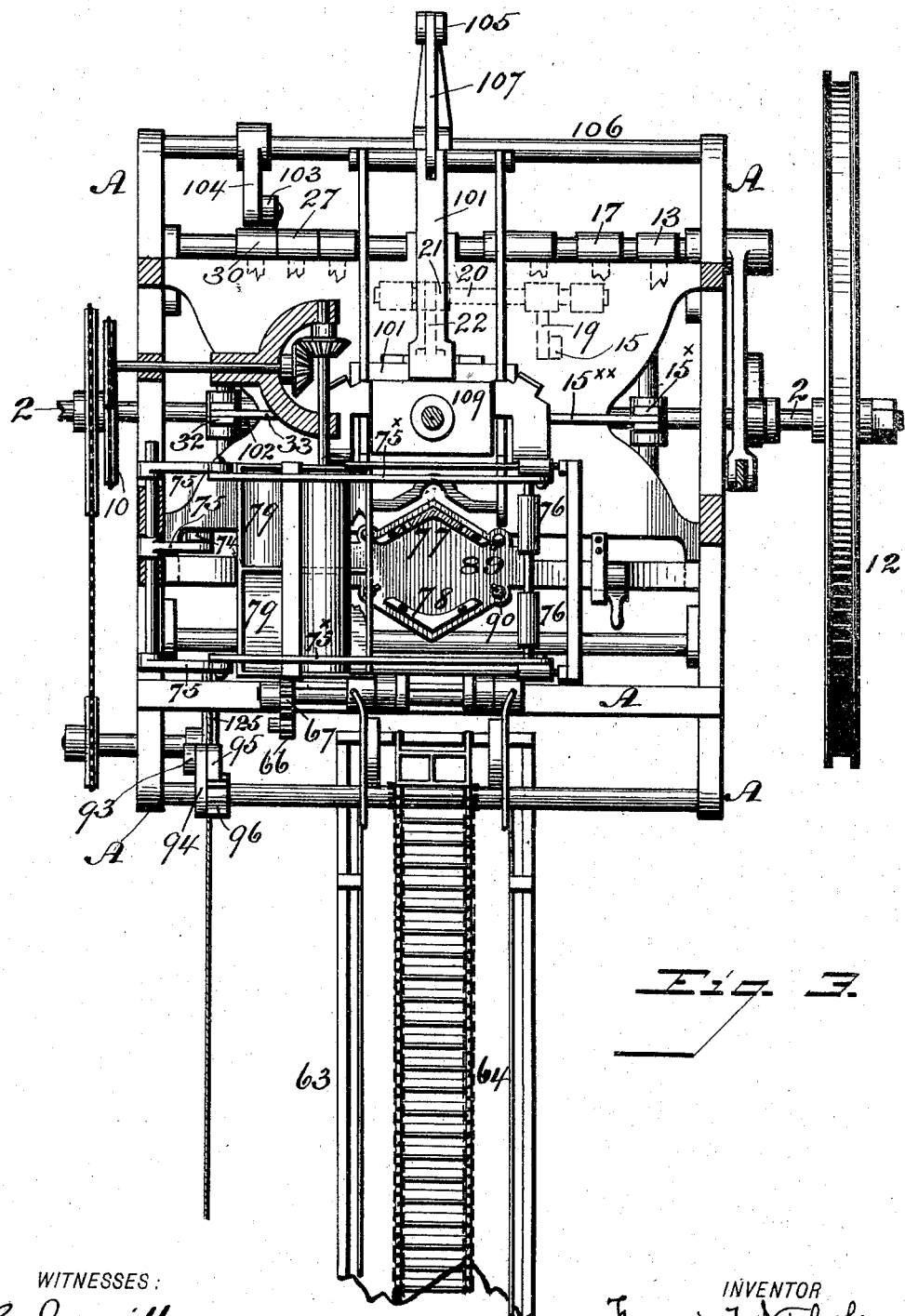

Figure 1 represents a side elevation of a portion of an envelope-machine embodying my invention. Fig. 2 represents a rear view thereof. Fig. 3 represents a horizontal section on line $x\ x$, Fig. 1. Fig. 4 represents an irregular vertical section of a portion of the machine. Fig. 5 represents a horizontal section on line $y\ y$, Fig. 1. Figs. 6, 7, and 8 represent detail views, partly sectional. Fig. 9 represents a plan view of a detail portion. Fig. 10 represents a perspective view of a portion of the machine. Fig. 11 represents a plan view of a detached portion, partly sectional. Fig. 12 represents a side view, partly sectional, of a detached portion. Fig. 13 represents a plan view, on an enlarged scale, of a detached portion. Fig. 14 represents a vertical section on line $z\ z$, Fig. 13, same scale. Fig. 15 represents a detail view, partly sectional, (about full size,) showing one of a pair of grippers, the same being closed. Fig. 16 represents a detail view, partly sectional, showing the gripper (referred to in Fig. 15) opened. Fig. 17 represents a view of a detached portion, partly sectional. Fig. 18 represents a plan view of one of the grippers shown in Figs. 15 and 16. Figs. 19 and 20 represent sectional views of another gripper, respectively closed and opened. Fig. 21 represents rear views of two forms of envelopes as gummed in accordance with my invention. Fig. 22 represents a detached view of mechanism for guiding the previously-gummed envelope to the second gumming mechanism. Fig. 23 represents a detached view of certain parts shown in Fig. 4. Figs. 24, 25, and 27 represent side elevations of detached portions of the machine. Fig. 26 represents a front elevation of a portion of the machine. Fig. 28 represents an end view of a part of the portion shown in Fig. 27. Fig. 29 represents a perspective view of a detached portion. Fig. 30 represents a perspective view of the lower part of a lever shown in Fig. 29 and the cam for operating the same, the scale of said Figs. 24 to 30, inclusive, being greater than that shown in the previous figures. Fig. 31 represents a partial end elevation and partial vertical section of a detached portion of the machine. Fig. 32 represents a partial plan view and partial horizontal section of the portion of the machine comprising the features shown in Fig. 31 and adjacent parts.

Similar letters and numerals of reference indicate corresponding parts in the several figures.

Referring to the drawings, A designates the frame of the machine, which is supported on legs 1, and on which is mounted the driving-shaft 2, the latter carrying the cams 3, 4, 5, 6, 7, and 8, the sprocket-wheels 9 and 10, the driving-pulley 11, and balance-wheel 12. Engaging the cam 3 is an arm 13, which is mounted in the shaft 14 on the frame A, and pivoted to an arm 15, which, by means of the elbow lever 15$^\times$ and link 15$^{\times\times}$, operates the hinged folder 16, the bearings of said lever, link, and folder being on suitable portions of the frame A. Engaging the cam 4 is the arm 17 on the shaft 14, said arm connecting an arm 18 with an arm 19, the latter being mounted on the rock-shaft 20, which carries the arm 21, pivoted to which latter is a link 22, which is attached to and operates the folder 23. Engaging the cams 5 and 6 are arms 24 and 25, which are pivoted to the gate 26, which closes the bottom opening of the table 26$^\times$, to which the several folders are hinged. (See Fig. 4.) Engaging the cam 7 is the arm 27, to which is connected the arm 28, which latter is pivoted to the folder 29. Engaging the cam 8 is the arm 30, which, by means of the arm 31, communicates motion to the elbow-lever 32 and thence to the link 33, which latter is pivoted to and operates the folder 34.

Mounted on the shaft 2 is a gear-wheel 35, which meshes with a gear-wheel 36, the latter being mounted on the shaft 37 on the frame A, to which shaft are keyed or otherwise secured the cams 38, 39, $39^\times$, 40, 41, 42, and 43. (See Fig. 2.) Engaging the cam 38 is an arm 44, which is pivoted to an elbow-lever 45, on which is hung a pawl 46, which engages with a ratchet-wheel 47, the latter being mounted on a shaft 48, to which is secured a reel 49. Engaging the cams 39 and 42 are arms 50 and 51, which, by means of arms 52 53 and links 54 55, operate the supporting-rods 116 of the cross-head 56 to raise the same, the return motion of said head being accomplished by a spring $56^\times$, attached to the arms 54 and a proper part of the frame. (See Figs. 4 and 23.) Engaging the cam 40 is an arm 57, (see Fig. 4,) which, by means of arms 58 59, operates the gummer 60, the latter having depending therefrom a stem $60^{\times\times}$, which is guided in a sleeve or boss $60^{\times\times\times}$, secured to the frame A of the machine. Engaging the cam 41 is an elbow-lever 61, which carries the roller $61^\times$, that supplies adhesive material from the cup $61^{\times\times}$ to the said gummer 60, said cam 41 also engaging the pivoted arm 62, whose upper end freely enters the bottom of a box 63, above which is mounted the endless chain or conveyer 64, said arm 62 serving to cause envelopes to properly enter the box 63 after they drop from the conveyer 64. (See Fig. 8.) In the cup $61^{\times\times}$ is a roller which is operated by means of a chain passing around the sprocket-wheel 9 on the shaft 2, said roller being adapted to have the traveling-roller $61^\times$ come in contact with it, whereby the gummer 60 will be properly supplied with material.

The gumming-roll $61^\times$ and its operating mechanism are omitted from Fig. 4 for purpose of clearness of the figure, but are plainly seen in Fig. 8. The shaft which carries the arm 52 and lever 61 is not seen in Fig. 2, as the same is concealed by a brace-rod of the frame being in front of said shaft. The button 84 is not seen in Fig. 17, as the portion of the cross-head 56 in which said button is guided is removed.

Engaging the cam 43 is an arm 65, which is pivoted to a projection on a toothed segment 66, which is mounted on the frame A, and meshes with the pinion 67, whose shaft 68 carries the plates $68^\times$, on which are mounted the grippers 69, a portion of said plates being between the jaws 119 and 122 of said grippers.

On the shaft 2 is a pinion 70, which meshes with a gear-wheel 71, which is mounted on the frame A and provided with a cam 72, which engages with a lever 73, to which is pivoted the arm 74, which, by means of the connected levers 75, operates the links $75^\times$, which carry the rollers 76, which supply the primary gummers 77 and 78 with suitable adhesive material, which is obtained from the cup 79 on the frame A, it being noticed here that said gummers and the mechanism for operating the roller 76 are well known in this class of envelope-machines.

Within the box 63 is an inclined guide 80, through which the upper end of the arm 62 freely passes, and above said guide are depending fingers 81, which are pivoted to the box and adapted to swing to the dotted position $a$, (shown at the right side of Fig. 4,) thereby permitting an envelope to pass under said fingers, after which the fingers drop and abut against a suitable stop $81^\times$, whereby they are prevented from returning too far, thereby holding the envelopes in proper position.

Depending from the cross-head 56 are swinging fingers 82, (see Figs. 4, 6 and 7,) the same being adapted to move from vertical to horizontal positions, as shown in said Figs. 6 and 7, said cross-head being further provided with laterally-projecting lips 83, and a depending spring-actuated button 84, (see Fig. 4,) the latter firmly holding the envelope on the table 115.

On the frame A is a rock-shaft 85, to which are secured the arms 86, which carry the grippers 87, motion being imparted to said shaft by means of an arm 88 connected therewith, and the cam $39^\times$, which engages with said arm. (See Fig. 4.)

Referring to Figs. 15, 16, and 18 it will be seen that the upper jaw of a pair of grippers 87 is stationary on the arms 86, and the other jaw thereof is pivotally mounted thereon, the said pivoted jaw having mounted on it the swinging spring-pressed arm 110, which rides against the inclined finger 111, which is secured to the frame A, said arm passing freely through the upper jaw and having a shoulder 112, which is adapted to engage with the under side of the same. (See Fig. 16.) Rising from the lower jaws and pivoted thereto are pins 114, which are adapted to be struck by the cross-head when the latter lowers, thus forcing the lower jaws from the upper jaws, thereby opening the grippers.

On the frame is a table 89, which is adapted to receive the envelope-blanks shown at $89^\times$. (See Figs. 13 and 14.) Rising from four parts of said table are adjustable posts 90, which are provided with gravitating dogs 91, and whose inner sides are serrated, whereby the gummers 77 and 78 are prevented from taking up more than one envelope-blank at a time, said dogs being of angular form, the outer ends of the lower limbs thereof being pivotally connected with said posts, so that the tendency of the vertical limbs of said dogs is to turn inwardly against the pile of envelopes on said table.

To the rock-shaft 85 is secured an arm 92, which imparts motion to the arm 93 and elbow-lever 94, which are mounted on the frame A, said lever carrying a pawl 95, which engages with a ratchet-wheel 96 on the shaft $96^\times$ of a roller of the carrier 64, whereby intermittent motion may be imparted to said carrier, the finished envelopes being deposited thereon prior to being directed into the box 63.

Adjacent to the reel 49 is a horizontal plate or table 98, which is secured to the frame A. (See Fig. 4.) Rising from said plate is a guard or lip 97, which is so disposed that the sealing-flap 99 of an envelope is prevented from dropping and coming into the path of the gummer. (See Fig. 17.)

Interposed between the grippers 69 and the reel 49 is a horizontal plate or table 115, which is located below the fingers 82. (See Figs. 4, 6, 7, and 17.) The plate 115 is covered by a supplemental plate having an opening therein for the reception of the drop pawls or fingers 82, said plate 115 closing the bottom of said opening and serving as a socket for said fingers, as more particularly shown in Fig. 6.

The rods 116, which support and guide the cross-head 56, carry the rollers 117, which are adapted to strike the tongues or tails 118, projecting rearward from the pivotal jaw of the grippers 87. (See Figs. 15 and 16.) On the arm 86 is a spring 87$^\times$, which bears against the jaw 87 for closing the same. On the jaw 87 is a spring 110$^\times$, which bears against the arm 110. The rods 116 are mounted on ears on the frame A, as shown in Fig. 25, said rods being also shown in Figs. 6, 7, and 15.

In Figs. 4 and 6 the rollers 117 are shown somewhat lower than they are when in their operative position, so that said rollers may be more clearly seen in said figures. The collars which carry said rollers 117 may be raised and lowered on said rods 116 and the rollers thus adjusted relatively to the grippers 87, after which said collars may be retained in position by means of suitable set-screws.

Referring to Figs. 19 and 20, it will be seen that the grippers 69 are pivoted on the plate or table 68$^\times$, secured to the rock-shaft 68, to which motion is imparted by means of the gearing 67 and 66, as has been stated. Adjacent to the grippers are pins or studs 120 and 123, against which the jaw 119 and stop-tails 122 of the grippers are adapted to abut, as will be hereinafter more fully referred to. Connected with the support of the plate 68$^\times$ of the gripper 69 is a spring 124, which projects through an opening in said plate and bears against the back of the tail 122 of the jaw 119 for preventing improper motion thereof.

A fan or blower (not shown in the drawings) is employed for drying the adhesive material on the envelopes, the same being operated by a pulley 125, which is mounted on the lower part of the frame A, and receives motion from a suitable movable member of the machine.

It will be understood that the primary gumming of the envelope, of the flaps including the sealing-flap, and the folding of the same into an envelope is similar to machines heretofore in use; but the operation of the same will be described to show the continuity of action from the taking up of a blank to the gumming and folding of the same, thus producing an envelope and the application of adhesive material on the back of the envelope opposite to the usual adhesive material on the sealing-flap, or solely on said back, if so desired.

The table 89 is swung out, as shown in dotted lines, at $b$ Fig. 4, and a pile of envelope-blanks 89$^\times$ placed therein, the same being held uniformly in position by the posts 90. (See Figs. 13 and 14.) The table is now returned to its normal position (shown in full lines, Fig. 4,) and the machine started. The gummers 77 and 78, having been previously supplied with adhesive material, descend and apply the latter to a blank, and the blank adheres to the gummers, so that when the same rise, the blank is carried with the same. As the blank rises, it comes in contact with a stripping plate 100, which removes it from the gummers 77 and 78, thereby causing it to drop, and in so doing it falls on a sliding carrier 101, which receives a reciprocating motion by means of the cam 102, arms 103, 104, and 105, and link 107, the arms 104 and 105 being mounted on the rock-shaft 106 at the rear of the machine. The carrier 101 brings the blank over the opening 108 of the folding device when the plunger 109 descends, thereby forcing the blank into said device and removing it from the carrier. The folders 16, 23, 29, and 34 are now operated, thus producing an envelope, the sealing-flap of which is properly gummed. The gate 26 then opens, whereby the envelope drops and is then caught between the proper arms of the reel 49, when the latter rotates sufficiently to bring the envelope in the path of the grippers 87, the latter then advancing. (See Fig. 16.) When the advance of the grippers is sufficient, the arm 110 rides against the finger 111, releasing the shoulder 112 from its hold on the upper jaw. Owing to the pressure of the spring 87$^\times$, the jaw then takes hold of the envelope. The grippers now return, carrying the envelope with them, as shown at 113, then striking the fingers 82 and raising them, as shown in Fig. 17, and permitting the cross-head 56 to lower sufficiently to firmly hold the envelope on the plate 115, while the gummer 60 rises and applies adhesive material to the back of the envelope, (see Fig. 17,) the same being at a place opposite to that on the sealing-flap. The lips 83 at the top of the cross-head now reach the pins 114 and press against the same, thus opening the grippers. The arm 110, under the action of the spring 110$^\times$, which bears against the same, then advances, and its shoulder 112 engages with the upper jaw, causing the grippers to remain open preparatory to the next advance and subsequent grasp of another envelope. Should the grippers 87 from one cause or another fail to grasp an envelope in the reel, the fingers 82 will not be thrown outward, as before described, but will descend in a vertical position, as shown in Fig. 6, thereby striking the plate 115 and preventing farther descent of said cross-head. On the upper face of the plate or table 115 are slots in which the lower ends of the fingers are now seated, thus preventing slipping of the same. The object of this is to keep the cross-head out of the reach of the gummer 60 when no envelope is between said cross-head and gummer. Otherwise gum would be applied to said cross-head, which would in turn apply it to the face portion of and spoil an envelope, as is evident. (See Fig. 6.) When the cross-head 56 is kept in elevated position, as just described, the lips 83 do not reach the pins 114 and consequently do not open the jaws of the grippers 87. As it is necessary that the jaws 87 should always be opened when moving toward the reel 49, the rollers 117 on the guide-rods 116 (see Fig. 15) strike the tails 118 and open the same. This is accomplished when the cross-head 56 and guide-rods 116 rise, it being evident that said rollers 117 strike the under side of said tails 118, which causes the lower jaws of the grippers 87 to open and permit the spring-pressed arms 110 to advance, so as to cause their shoulders 112 to keep said grippers open until said arms 110 again contact with the inclined fingers 111, which, as before described, closes said jaws. When the arms 86 are moving away from the reel 49, they carry with them the grippers 87, so that the tails 118 of said grippers travel in the direction indicated by the arrows $e$ in Fig. 24. The position of the tail 118 in the gripper 87 (shown in full lines at the left-hand portion of Fig. 24) corresponds to the position of said tail 118, as shown in Fig. 15, it being noticed that when the tail 118 is in this position, the jaws of the gripper 87 are closed. When the grippers 87 move away from the reel 49, the rollers 117 occupy a position some distance below the tails 118 of said grippers, as shown at $a\,b$, Fig. 24, so that said tails 118 pass over the rollers 117, as shown in dotted lines in Fig. 24. When the grippers 87 have reached their farthermost position from the reel 49, the rods 116 are then raised, as hereinbefore described, and bring the rollers 117 thereon in the path of the tails 118, as shown in dotted lines at $b\,c$, Fig. 24, so that said tails 118 come in contact with the rollers 117, it being noticed that the upper portion of the periphery of the rollers 117 are a trifle above the point that is first struck by the tails 118, when the same travel in the direction indicated by the arrow $f$ in Fig. 24, and are caused to ride over said rollers 117, and thus be raised and occupy the position shown in dotted lines at $c\,d$ in Fig. 24, which position corresponds with that of the tail 118 shown in Fig. 16. It is then evident that the jaws of the grippers 87 are in open position before the same reach the reel 49. When an envelope has been deposited on the plate 115 and adhesive material applied thereto by the gummer 60, the jaw 119 of the gripper 69 closes against the plate $68^{\times}$, the envelope being between said parts. (See Fig. 19.) The grippers then rotate and the jaw 122 strikes the pin 123, whereby the gripper opens. (See Fig. 20.) The envelope now drops on the endless chain 64, which conveys it to the box or hopper 63, from which it is duly removed. When the grippers 69 are to remove an envelope from the plate 115, the jaws of said grippers are in the position shown in dotted lines, Fig. 19, and remain so until the rock-shaft 68, to which said grippers are secured, rotates sufficiently to cause the jaws 119 to strike the pins or studs 120 and close said jaws, as shown in full lines, and thus take hold of an envelope. The rock-shaft 68 now rotates in the direction of the arrow, Fig. 19, until the jaws 122 of the gripper abut against pins or studs 123, which cause the jaws 119 to open, as shown in Fig. 20, and thus release the envelope 113, which drops on the endless chain 64. The grippers 69 then rotate and return in the direction of the arrow in Fig. 20, in which said grippers may be seen open, so as to grasp the next envelope on the table 115, as before described. When an envelope fails to pass over the table 115 and thus throws out the fingers 82 to the position shown in Fig. 7, said fingers remain in an upright position and rest upon the table 115, as shown in Fig. 6, so that the descent of the cross-head 56 against the gummer 60 is prevented, and it will be seen that the lower end of the arm 50, which is connected with the arm 52, is bifurcated to pass freely over the shaft 37 of the operating-cam 42, (see Figs. 4 and 23,) so that while the spring $56^{\times}$ ordinarily causes the descent of the cross-head it expands when the tongues are stopped by the plate 115, and thus breaking of the parts is prevented.

Referring to Figs. 10 and 11, it will be seen that the table 98, which is adjacent to the reel 49 and serves to sustain the guard 97, is removably supported by means of a fork $98^{\times}$ on the sliding rod $99^{\times}$, which holds the fork in operative position by means of a spring $99^{\times\times}$ and a pin $99^{\times\times\times}$, said rod being mounted on the standard A' of the frame A.

Referring to Fig. 4, there are shown below the gate 26 the guides 26' and $26^2$, the same being in pairs, connected with the upright plates $26^3$, which are located between the sides of the reel 49. Near the axis 48 of said reel there are a pair of rests $26^4$, which are also secured to the said plates $26^3$, it being noticed that when the envelope drops from the gate 26 it is directed by the guides 26' and $26^2$ to the proper spokes of the reel by which it is carried to the rests $26^4$, and it is deposited or left on the latter as said spokes pass said rests in such position that it is positively in the path of the grippers 87. Above the axis $96^{\times}$ of the roller of the carrier 64 is a pair of guides 64', which are attached to upright plates $64^2$, secured to the frame A. (See Figs. 1 and 4.) In said plates are slots $64^3$ to receive the screws $64^4$, by which said guides may be firmly held in position and by which they may be adjusted according to requirement, said guides serving to direct the envelopes from the grippers 69 to said carrier 64 and place said envelopes uniform into or upon said carrier.

The guides 26' and rests 26⁴ may also be adjusted according to requirement, they being held in position by means of set-screws which pass through slots in the plates 26³ and engage with said rests.

Having thus described my invention, what I claim as new, and desire to secure by Letters Patent, is—

1. An organized machine for manufacturing flap-gummed envelopes, in combination with an organized machine for applying gum to the backs of the bodies of said envelopes, and a table between the two machines having an opening therein, said second named machine having a reel, a gripper, a table, said gripper being movable to and from said reel and table, an additional gummer and operative mechanism for applying gum to the bodies of envelopes, and an additional gripper for conveying the doubly-gummed envelope from the machine, the reel of the second named machine being below the opening in the intervening table of the two machines, substantially as described.

2. An envelope-gumming machine having a reel, grippers, a table, and additional grippers aside of the latter, a gummer below said table, and a conveyer adjacent to the second named grippers, and means for opening and closing both sets of grippers and reciprocating the same, the first named grippers being movable between said reel and table, and the second named grippers being movable between said table and conveyer, said parts being combined substantially as described.

3. An organized machine for manufacturing flap-gummed envelopes, in combination with grippers, a table, a gummer, additional grippers and a conveyer, means for operating said grippers, gummer and conveyer, and a reel intermediate of the discharging portion of said machine and the first named grippers, the first named grippers being movable between said reel and table, and the second named grippers being movable between said table and conveyer, substantially as described.

4. The grippers 87 consisting of stationary and movable jaws, a spring bearing against the movable jaw for closing the same, a shouldered arm connected with the movable jaw and adapted to engage with the stationary jaw, an oscillating support carrying said jaws, and a pin connected with the movable jaw and projecting beyond the stationary jaw, in combination with an inclined finger with which said arm is adapted to engage, and a movable rod having a lip which is adapted to engage said pin, said finger being secured to the frame and said rod being guided on the frame, substantially as described.

5. The grippers 87 formed of stationary and movable jaws, with means for closing the movable jaw in combination with a pin which is pivoted to the movable jaw and projects freely through an opening in the stationary jaw, and a lip which is adapted to engage said pin and is carried by a reciprocating rod, substantially as described.

6. The rising and falling cross head 56, the rod 116 carrying said head and means for operating said rod, in combination with the gripper 87, the movable arm of which is provided with the tail 118, said rod being provided with the roller 117 for engagement with said tail, substantially as described.

7. The rising and falling cross head 56 having a spring-pressed button 84 depending therefrom, and a lip 83 projecting laterally therefrom, in combination with the envelope holding table 115 below said button and lip, and grippers, the movable jaw of the latter being provided with a pin 114 which rises from the same, and is adapted to be engaged by said lip, said parts being combined substantially as described.

8. The table 115 and the rising and falling cross head 56 having lips 83 thereon, in combination with the grippers 87 means for reciprocating the latter and pins 114 connected with the movable jaws thereof, said pins being adapted to be engaged by said lips in order to open said jaws, substantially as described.

9. The oscillating gripper 69 formed of the jaw 119 with the tail 122 continuous thereof, the plate 68ˣ on which said jaw is mounted, the rock shaft 68 carrying said gripper, means for operating said shaft, and pins 120 and 123 on the frame, said plate 68ˣ having an opening to receive the axial end of said jaw 119, the tail 122 and said jaw 119 being on opposite sides of said plate, substantially as described.

10. The gripper 69 consisting of the jaw 119 with the tail 122, the plate 68ˣ intermediate of said jaw and tail, the rock shaft 68 with which said plate is secured, a spring on said rock shaft bearing against the back of said jaw, and pins on the frame with which said jaw and tail may contact, said parts being combined substantially as described.

11. The pins 120 and 123, in combination with a gripper formed of a jaw with a tail, a plate which supports said jaw, means for oscillating said plate, and a spring connected with the support of said plate, and bearing against the back of the jaw, the plate having an opening for the pivotal portion of the jaw and reception of said spring, the jaw and its tail being on opposite sides of said plate, and said parts being combined substantially as described.

12. An envelope machine having a reel 49, plates 26³ on opposite sides of said reel, the separated guides 26' and 26² on the sides of said plates, and the rests 26⁴ at the bottom thereof, said parts being combined substantially as described.

13. An envelope machine having a reel 49, plates 26³ on opposite sides of said reel, the separated guides 26' and 26² on the sides of said plates, and the rests 26⁴ at the bottom thereof, in combination with the gate 26 above said guides 26' and 26² and the gripper 87 aside of the reel, substantially as described.

FRANCIS T. NICHOLSON.

Witnesses:
 GUSTAVE BAUER,
 P. R. RAHM.